United States Patent [19]

De Zeeuw

[11] Patent Number: 4,738,714
[45] Date of Patent: Apr. 19, 1988

[54] POWDER FILLED TUBE AND A METHOD FOR THE CONTINUOUS MANUFACTURE OF SUCH TUBE

[75] Inventor: Johan De Zeeuw, Wageningen, Netherlands

[73] Assignee: Hoogovens Groep B.V., Ijmuiden, Netherlands

[21] Appl. No.: 10,647

[22] Filed: Feb. 4, 1987

[30] Foreign Application Priority Data

Feb. 10, 1986 [NL] Netherlands .......................... 8600314

[51] Int. Cl.$^4$ ............................. C21C 7/00; C22C 1/00
[52] U.S. Cl. ....................................... 75/53; 75/93 G; 420/590
[58] Field of Search ................... 75/53, 93 G; 420/590

[56] References Cited

U.S. PATENT DOCUMENTS

| | | | |
|---|---|---|---|
| 2,014,983 | 9/1935 | Quarnstrom | 137/75 |
| 3,470,605 | 10/1969 | Benteler et al. | 29/498 |
| 3,543,381 | 12/1970 | Martin | 29/429 |
| 4,126,446 | 11/1978 | Knorre | 75/53 |
| 4,174,962 | 11/1979 | Frantzreb | 75/53 |
| 4,200,456 | 4/1980 | Fujii | 75/53 |
| 4,297,133 | 10/1981 | Fujii | 75/53 |
| 4,364,770 | 12/1982 | Douchy | 75/53 |
| 4,486,227 | 12/1984 | Douchy | 75/53 |

FOREIGN PATENT DOCUMENTS 3370 3/1982 European Pat. Off. .
1313292 4/1973 United Kingdom .
1604144 12/1981 United Kingdom .

Primary Examiner—Peter D. Rosenberg
Attorney, Agent, or Firm—Stevens, Davis, Miller & Mosher

[57] ABSTRACT

A powder filled tube has a steel outer wall which consists of two layers formed as two complete turns of a spiral made from a single strip and welded together at their interface to form a unitary wall. The method for the continuous manufacture of this tube involves
(i) forming a steel strip into a channel,
(ii) introducing the powder filling into the channel,
(iii) closing the channel by rolling it into a tube in which, as seen in cross section, the steel strip overlaps itself by at least 360° so that the tube wall has two layers around its whole circumference and the powder filling is compacted,
(iv) heating the tube and while hot subjecting it to stretch/reduction rolling in which simultaneous size reduction and extension of length take place and in which the two wall layers are welded together by the effect of the elevated temperature and the pressure applied in rolling.

8 Claims, 2 Drawing Sheets

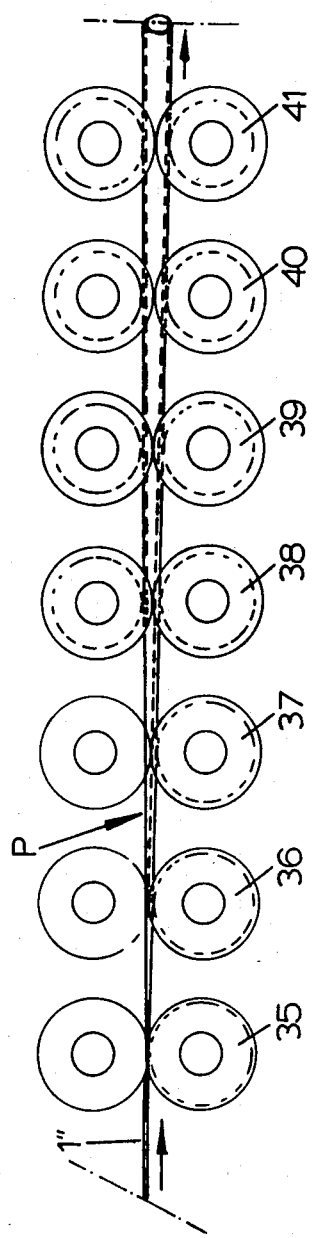
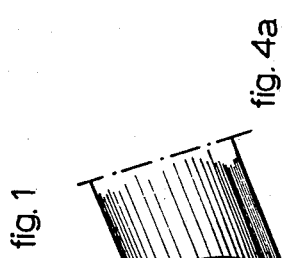
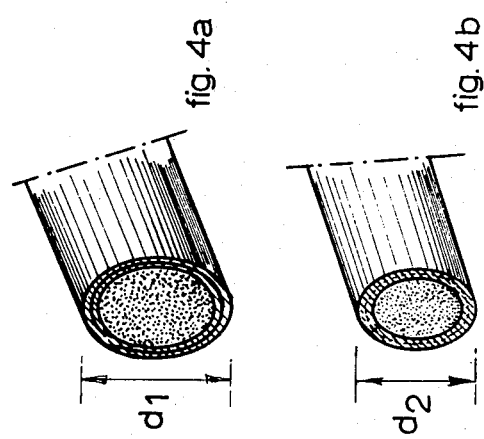
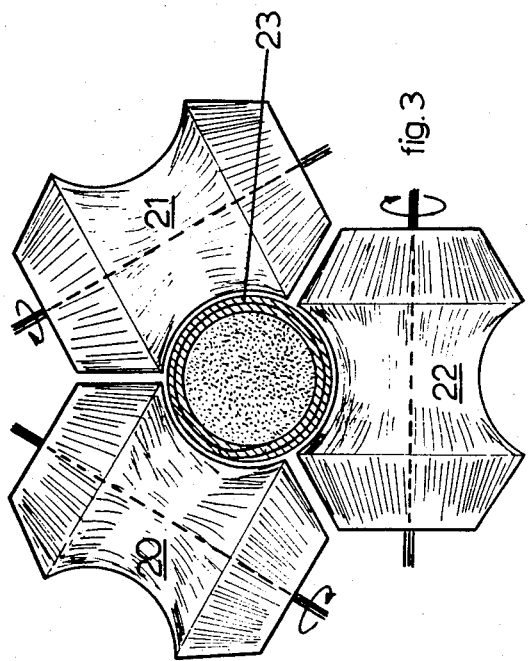

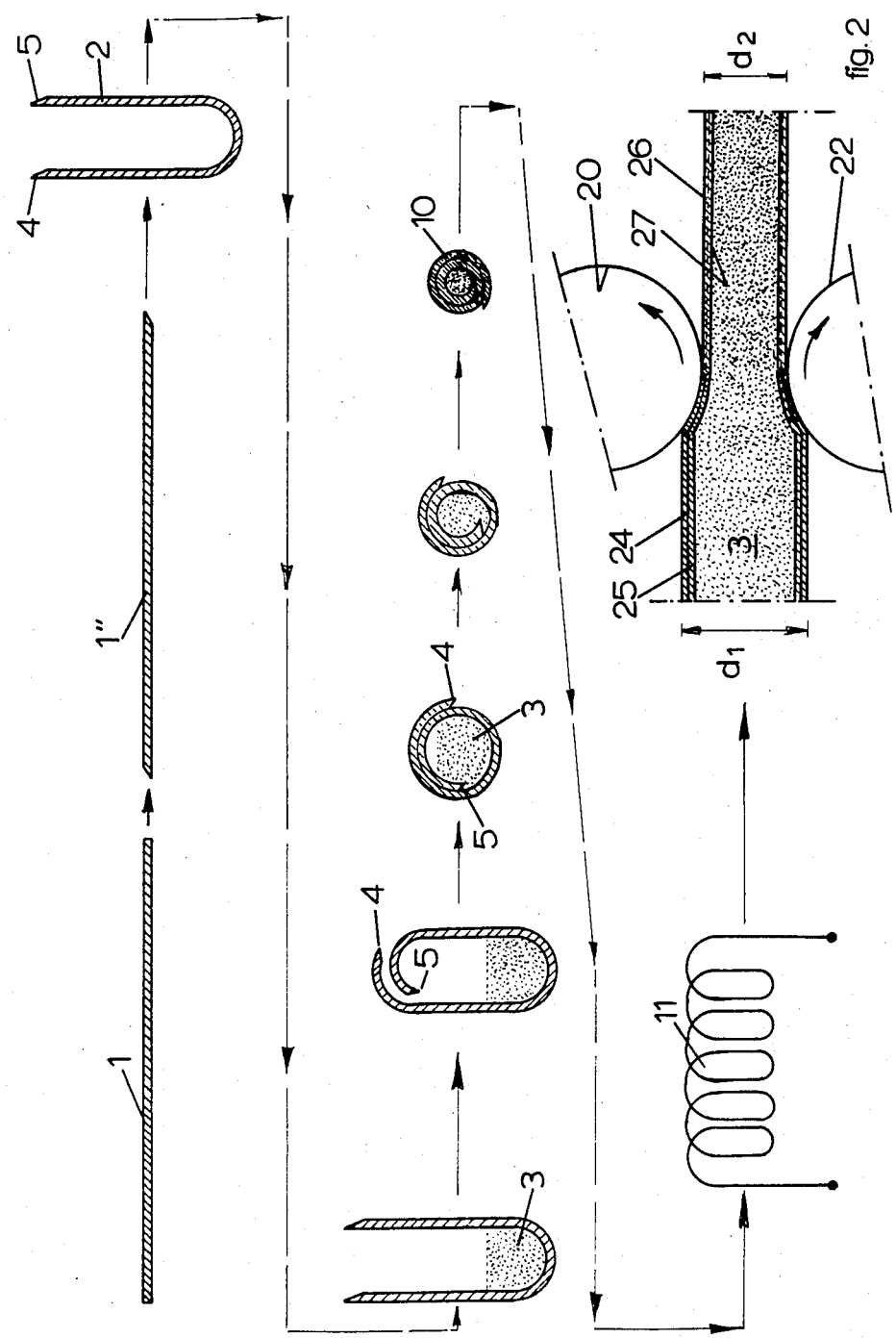

POWDER FILLED TUBE AND A METHOD FOR THE CONTINUOUS MANUFACTURE OF SUCH TUBE

BACKGROUND OF THE INVENTION

1. Field of the Invention

The invention relates to powder-filled tube and to a method for the continuous manufacture of such tube. The invention is particularly but not exclusively applicable to powder-filled tube known as ladle wire which is used in metallurgical processes, and to powder-filled tube used as, or in the manufacture of, welded rod.

2. Description of the Prior Art

Powder-filled tube having a steel outer wall welded to form a closed tube and a compacted powder core in the closed tube is well known. Various methods, none of them wholly satisfactory, for manufacturing such tube have been proposed.

In GB-A-No. 1,604,144 and EP-A-No. 3370 methods are described for the continuous fabrication of a welded tube filled with powder, starting from a strip of metal which is formed into an open channel, into which filler powder is fed. In this condition the edges of the channel are brought together and held together by pressure after which a closed longitudinal seam is created by electric welding. Afterwards the diameter of the closed tube is reduced so that the powder filler within the tube is substantially compressed and thereby cannot shift during further handling. This method has the practical difficulty that the nature of the powder can negatively influence the quality of the weld made can contaminate the edges of the strip through the magnetic ingredients in the powder. At the same time there are limitations on the filling ratio (the weight ratio between the quantity of powder and the quantity of steel per unit length). Also there are limits to the production rates achievable.

U.S. Pat. No. 3,543,381 shows a process in which a strip is formed into a channel, the channel is filled and then the channel edges are brought together to form a butt seam or a lapped seam. The seam is not welded. Compaction of the powder is poor, and the powder may leak or be contaminated because the seam is not an adequate seal. DE-A-No. 2,603,412 similarly described the production of a filled tube with a lapped, non-welded seam, but in this case the powder is first compacted into a wire-shape before being inserted into the tube.

SUMMARY OF THE INVENTION

The object of the invention is to provide a product in the form of a powder-filled tube in which welding of the edges is unnecessary and in which nonetheless hermetic sealing of the filler powder is achieved.

According to the invention this product in one aspect a powder-filled tube having a steel outer wall welded to provide a closed tube of uniform thickness all around its circumference and a powder filling enclosed within the steel outer wall is characterized in that the steel outer wall consists substantially all around its circumference of at least two layers which are formed as two complete turns of a spiral made from a single strip and are welded together at their interface to form a unitary wall.

The invention also relates to a method for the continuous fabrication of this new product. According to the invention, in this second aspect the method consists in passing a steel strip continuously through the following steps:

(i) forming the strip into a channel open upwardly,
(ii) introducing the powder filling into the channel so formed,
(iii) closing the channel by rolling it into a tube shape in which, as seen in cross-section, the steel strip overlaps itself by at least 360° so that the tube wall has at least two layers around its whole circumference and the powder filling is compacted,
(iv) heating the tube shape and while it is hot subjecting it to stretch/reduction rolling in which simultaneous size reduction and extension of length take place and in which the two wall layers are welded together by the effect of the elevated temperature and the pressure applied in rolling.

Preferably the tube shape is heated inductively. Preferably the stretch/reduction rolling is performed by at least two triple stretch/reducer roll sets each having three rolls with axes at 120° to each other.

This method offers a number of notable advantages. There are no more problems with welds; the problem of contamination of the strip edges by the powder filling especially is avoided. There are fewer strip-shaping problems, especially as the method is not so critical in respect of the positioning of the strip edges. The formation of the tube is much simpler. The output speed of the manufactured product can be very high, whilst because of the great size reduction which may be employed, thicker starting material can be used, which has an economic advantage.

It is a major advantage that any type of powders can be used as the filler, naturally provided that it can be readily dispensed into the channel. It is useful if the powder particles can withstand a short period of heating without disadvantage. Because the tube heating does not occur until the tube exterior is fully closed, there is only a capillary gap which extends over 360° of the circumference, no poisonous gases can escape into the atmosphere. It has now therefore become possible to use dangerous materials for the filler powder, such as gas-evolving calcium carbide, inflammable magnesium or poisonous tellurium.

Another advantage of the invention is that welding is accomplished by a rolling step, which can be carried out easily at a high process speed. Because the filling is compacted to a solid core before the welding step, it is possible to perform the stretch-reduction rolling of the heated tube which simultaneously effects the welding as well as the elongation and reduction of diameter. In prior art processes, e.g. that of EP-A-No. 3370, reduction has followed welding, which has been carried out by heating of the butting edges. In the present invention, of course, further stretch/reduction may follow the welding step.

It is mentioned that formation of steel tube having a welding multi-layer wall has in itself been proposed, in U.S. Pat. No. 3,470,605 and DE-A-No. 1,602,232, but these tubes are not filled tubes and consequently cannot be subjected to stretch/reduction. U.S. Pat. No. 3,470,605 proposed that the tube is heated to achieve welding of the layers in an oxygen-free atmosphere to a temperature in the softening range between the solidus and the liquidus lines, which is impractical for a powder filled tube. DE-A-No. 1,602,232 mentions heating to an unspecified temperature below the solidus line.

BRIEF INTRODUCTION OF THE DRAWINGS

Referring to the accompanying drawings a non-limitative embodiment of the invention will now be described by way of example. In the drawings:

FIG. 1 shows in schematic side view a sequence of successive tube forming stages in a complete production line embodying the method of the invention;

FIG. 2 shows in schematic cross section a strip of metal in various successive stages of the method of FIG. 1;

FIG. 3 shows schematically the triple stretch/reducer rolls used in the later stages of tube forming;

FIGS. 4a and b show, in perspective view, partially in section, a tube of the invention respectively before and after heating and subsequent reduction steps.

DESCRIPTION OF THE PREFERRED EMBODIMENT

In the method of the invention illustrated in the drawings, a narrow flat single ply strip 1 of uncoated steel in continual longitudinal motion is formed into a powder-filled tube whose steel covering is a wall of overall even thickness and is formed from two layers welded together. The width of the strip 1 is chosen according to the diameter of the tube to be fabricated and in dependence on the process performed.

The strip 1 is drawn from a rotatable coil, not shown in FIG. 1. When so called "slit strip" is used, the edges of the strip are square, as can be seen in FIG. 2. This makes for certain difficulties in further cold working. Because of this the strip 1 undergoes a preliminary stage of working, for example by rolling under pressure, to chamfer both longitudinal edges so that the strip 1" in FIG. 2 is formed. As will be described later, the strip 1" is bent over about 720° so that the chamfered edges 4 and 5 (FIG. 2) overlap each other. The forming of the strip to the two-ply walled tube by bending through about 720° or even more is carried out to a double overlap practically the same as the chamfer width. This principle is in itself known, from U.S. Pat. No. 2,014,983, for example.

As can be seen in FIG. 1, the chamfered strip 1" is led between the first set of rolls 35 of a complete line of tube forming stations comprising various sets of driven rolls 35 to 41, which in successive stages progressively turn the strip into a closed multi-ply tube. In FIG. 1, there are schematically shown always two opposed rolls per set, but these tube forming stations can be of a more complex design. The specific design for rolls 35 to 41 which form the strip during its passage through them, will be known to those skilled in this art, and these rolls need be neither drawn nor described in detail.

Firstly the strip 1" is folded by the rolls 35 and 36 to a U shaped channel 2 (FIG. 2) open upwards. The channel has a height greater than its width. This channel is shown as being symmetrical in FIG. 2, but may be asymmetric. The designations "upper" and "lower" are naturally for descriptive purposes and the terms imply no restriction in the absolute sense. The bending radius of the lower half is approximately (but somewhat greater than) that of the radius of the tube when closed up later (10, FIG. 2) but before reduction.

When the strip has been formed into a "U" shaped cross section 2 (FIG. 2), a desired, calculated quantity of powder 3 is introduced to a certain level, which is shown in FIG. 1 by an arrow. The introduction of powder into a channel is known in itself and described for example in patents GB-A-No. 1,313,292 and SE-A-No. 312,388. The channel is filled to less than half its height.

The following sets of rolls 37–41 (FIG. 1) turn the edges 4 and 5 of the channel into overlap (FIG. 2) and then the tube is rolled further tightly around the powder 3, thus compacting the powder. First the edges 4 and 5 are bent towards each other to give a tube with overlapping edges; during further rolling the walls slide over one another to the stage in FIG. 2 where the tube wall, shown in section and marked with the number 10, has an overall two ply wall. The powder 3 is then already highly compacted and forms a solid core.

In the following stage the formed and filled tube passes through an induction coil 11, which has the effect of inductively heating the interface of the two layers of the tube wall to about 700° C. Induction heating is preferred, because the skin effect produces the heating at the outside surface of the tube. Heat flows inwardly to heat the welding interface and finally the filling. The filling is therefore heated as little as possible. The preferred temperature range achieved at the welding interface is 650°–750° C.

Immediately after the heating the tube while still hot is passed through two sets of triple stretch/reducer rolls, which in FIG. 2 are only shown schematically. A suitable set of such rolls (see FIG. 3) consists of three concave rolls 20, 21 and 22, which have axes at 120° intervals around the circumference of the tubular product 23, and bring about a further reduction of the diameter from d1 to d2. Two successive sets of these triple rolls may be employed, one closely behind the other.

Not only do these two stretch/reducer rolls reduce the tube diameter from d1 to d2 (FIG. 2); they also reduce the thickness of the two ply wall 24,25 to the same extent down to those of walls 26,27. The diameter of the 100% compacted core is likewise reduced in proportion to the tube diameter. The size reduction is accompanied by a corresponding length extension of the tube, since the solid core filling cannot be further compacted. This stretch-reduction process is similar to the well-known process of hot rolling a wire to reduce its diameter and increase its length.

The most important consequence of the inductive heating of the steel tube and the immediate subsequent high pressure stretching/reduction of the tubular product, with its two-ply wall, is that the two wall layers (26,27) weld together under the high temperature and applied pressure, so that in the walls 26,27 the capillary gap, which was initially present between the parts of the wall 24, 25 over approximately 360°, completely disappears.

This may be seen by comparing FIGS. 4a and 4b. In FIG. 4a the tubular product is reproduced before heating and stretch/reduction, and in FIG. 4b immediately after.

To achieve this effect, the strip does not need to be especially clean or de-oxidized; it is generally preferred that the strip is previously degreased. However the steel surfaces that are to come together should not bear any previous noticeable contamination from the filler powder.

After the welding step the tube is allowed to cool down and thereafter the seamless filled tube so obtained is made ready by means of coiling for transport to possible further processing departments or to the consumer.

Because an originally double walled tube is transformed by the application of rolling forces at high temperature, a new product has been produced, being a seamless unitarily walled tube, without making use of a solder or other joining material. By reducing the diameter and the wall thickness by rolling at high temperature the two walls are permanently, hermetically and indivisibly bonded to one another.

Compared to other methods for manufacturing powder filled tubes, the method according to the invention presented has the advantages that there are no influences upon quality stemming from a weld, that the production rate can be faster than those achievable with present day welding methods, and that it is simple to use a shielding gas when filling with powder. In this way no oxidation of the filler during later heating through the influence of oxygen from any enclosed air can occur.

A numeric example of the method according to the invention may serve as an illustration: starting from a degreased steel strip with width of 400 mm and a thickness of 0.7 mm and an entry speed of 60 m/min (=1 m/sec), a closed powder filled tube of 13 mm diameter and a wall thickness of 0.3 mm was manufactured, which after heating and reduction had an exit speed of 1400 m/min (23.3 m/sec).

This material is intended as ladle wire for metallurgical uses. It is also especially suited as a raw material for the preparation of filled welding rods.

I claim:

1. A powder-filled tube having a steel outer wall and a powder filling enclosed within the steel outer wall wherein the steel outer wall consists substantially all around its circumference of at least two layers of steel which are formed as two complete turns of a spiral made from a single strip and are welded together at their interface to provide a unitary wall in the form of a closed tube having uniform thickness all around its circumference.

2. A method for the continuous manufacture of a powder-filled steel tube comprising:
   (i) forming the strip into a channel open upwardly,
   (ii) introducing the powder filling into the channel so formed,
   (iii) closing the channel by rolling it into a tube shape in which, as seen in cross-section, the steel strip overlaps itself by at least 360° so that the tube wall has at least two layers around its whole circumference and the powder filling is compacted,
   (iv) heating the tube shape and while it is hot subjecting it to stretch/reduction rolling in which simultaneous size reduction and extension of length take place and in which the two wall layers are welded together by the effect of the elevated temperature and the pressure applied in rolling.

3. A method according to claim 2 wherein the heating of the tube shape in step (iv) is performed by inductive heating.

4. A method according to claim 2 wherein the heating of the tube shape in step (iv) raises the temperature at the welding interface to within the range 650° to 750° C.

5. A method according to claim 2 wherein the stretch-reduction rolling in step (iv) is performed by at least two sets of triple rolls in which each set is three rolls with their axes at 120° to each other.

6. A method according to claim 2 wherein the said upwardly open channel formed in step (i) has a height greater than its width and the powder filling is filled in step (ii) to a level which is less than half the height of the channel.

7. A method according to claim 3 wherein the stretch-reduction rolling in step (iv) is performed by at least two sets of triple rolls in which each set is three rolls with their axes at 120° to each other.

8. A method according to claim 3 wherein the said upwardly open channel formed in step (i) has a height greater than its width and the powder filling is filled in step (ii) to a level which is less than half the height of the channel.

* * * * *